United States Patent [19]

Brandstadter

[11] 4,156,536

[45] May 29, 1979

[54] HYDROPNEUMATIC SUSPENSION SYSTEM

[75] Inventor: Jack M. Brandstadter, Royal Oak, Mich.

[73] Assignee: Pneumo Corporation, Boston, Mass.

[21] Appl. No.: 781,984

[22] Filed: Mar. 28, 1977

[51] Int. Cl.$^2$ ............................................. B60G 11/30
[52] U.S. Cl. ............................... 280/705; 180/9.2 R; 280/714
[58] Field of Search .................. 280/705, 708, 714; 267/64 R, 64 A; 180/6.7, 9.2 R, 9.5, 9.52

[56] References Cited

U.S. PATENT DOCUMENTS

| 3,459,439 | 8/1969 | Sinclair | 180/9.2 R |
| 3,602,470 | 8/1971 | Reynolds | 180/9.2 R |
| 4,026,579 | 5/1977 | Foster | 280/705 |

*Primary Examiner*—David M. Mitchell
*Assistant Examiner*—John A. Carroll

[57] ABSTRACT

A hydropneumatic suspension system consists of plural separate individual wheel suspension units, one for each wheel, whereby should damage occur to any one of the units, it will not affect the operation of the other units. The heat generated by each individual wheel suspension unit is kept to a minimum, and the heat that is generated is dissipated through the vehicle hull by locating the valving and fluid passageways in close proximity to the hull. Increased heat dissipation may also be obtained by providing an air cooled tube in the fluid path between the actuator and accumulator, and by providing a flow path for the return fluid from the accumulator to the actuator in the unit mounting flange which is bolted or otherwise secured in close mating engagement with a large surface area of the vehicle hull.

36 Claims, 10 Drawing Figures

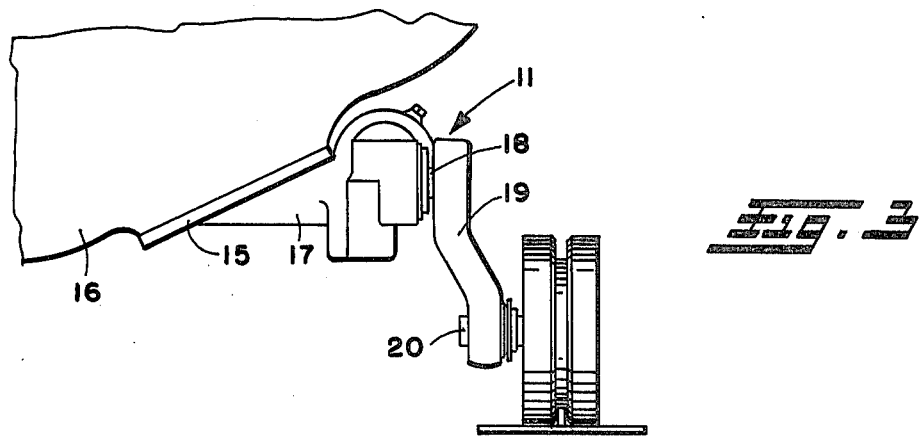
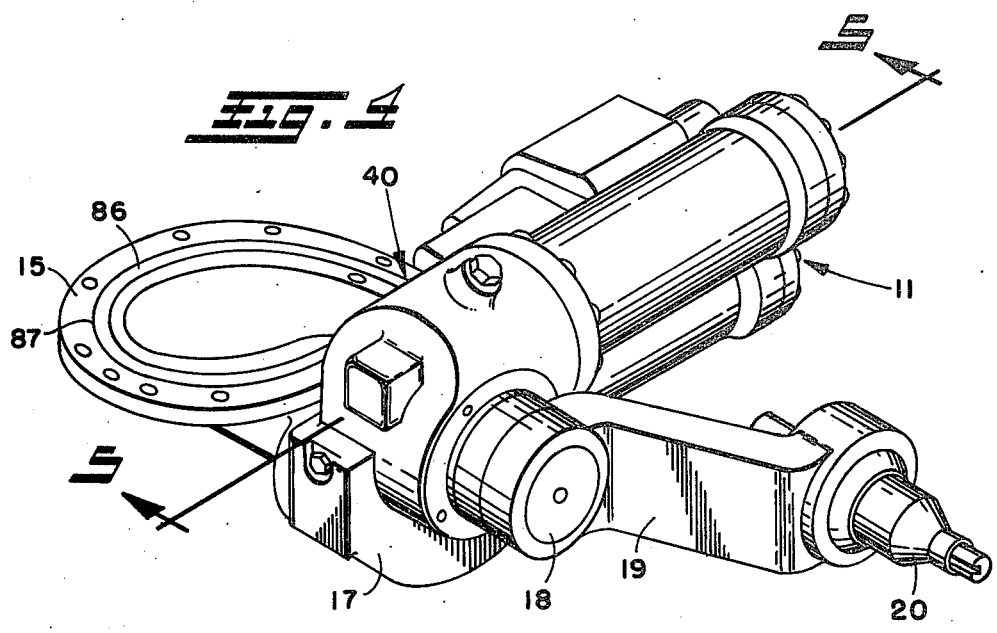
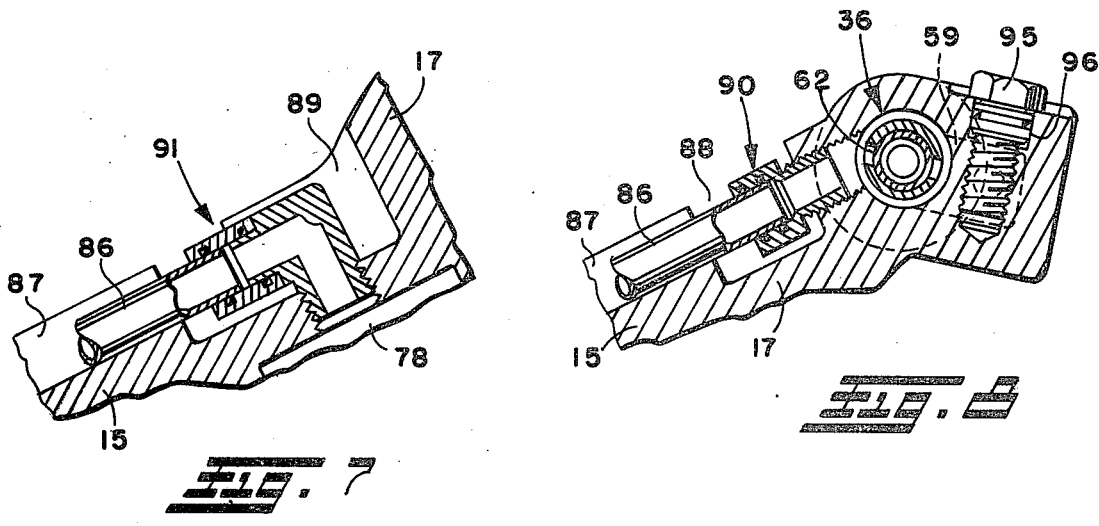

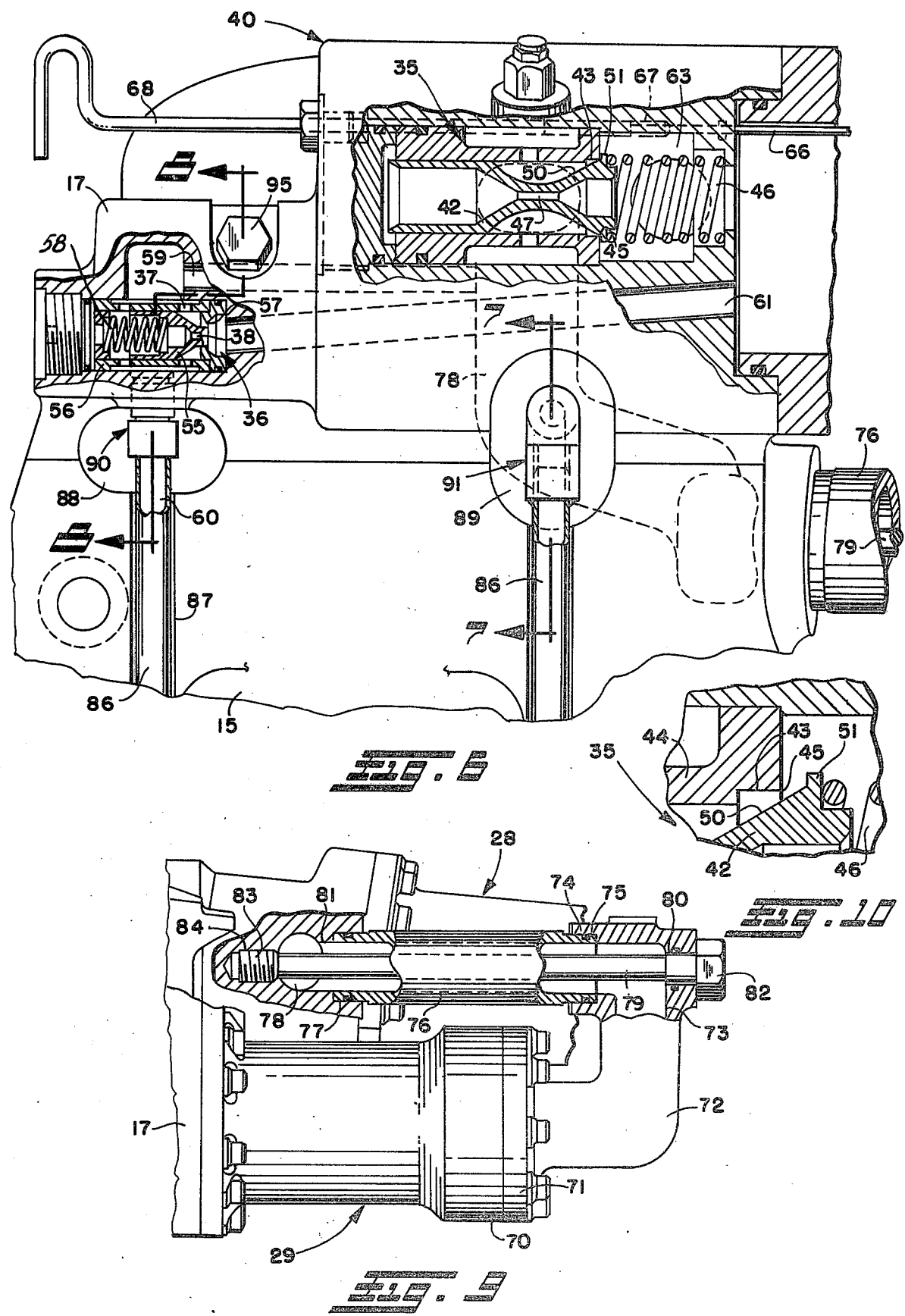

HYDROPNEUMATIC SUSPENSION SYSTEM

BACKGROUND OF THE INVENTION

This invention relates generally as indicated to a hydropneumatic suspension system for tanks and other heavy vehicles, including track or tire supported vehicles, and more particularly to certain improvements in such suspension system for increasing the performance so that each wheel will move upwardly over an obstacle without imparting a similar motion to the vehicle as a whole, for improving the damping characteristics of the vehicle, and for minimizing the generation of heat and providing for much better heat dissipation, thereby greatly improving the overall reliability and performance of the system and extending the life thereof.

Heretofore, various types of suspension systems have been employed for absorbing shocks experienced by the wheels of a moving vehicle passing over rough terrain. Conventionally, such suspension systems incorporate mechanical springs such as torsion bars and the like with hydraulic dampers or shock absorbers. However, such suspension systems do not have nearly the performance and reliability of the hydropneumatic suspension system of the present invention, and nor are they as versatile and durable as the subject hydropneumatic suspension system. Other hydropneumatic suspension systems have been employed in the past, but each of the individual wheel suspension units of such prior hydropneumatic suspension systems were required to be interconnected to a central hydraulic supply to dissipate the heat that was generated during the extremely high duty cycles to which the systems were subjected, which added to the complexity of the system, made it less reliable and more subject to potential damage, and more difficult to assemble or replace.

SUMMARY OF THE INVENTION

With the foregoing in mind, it is a principal object of this invention to provide a hydropneumatic suspension system in which the heat generated therein is effectively dissipated.

Another object is to provide such a system in which the overall reliability and performance of the system is much improved, and has a much greater useful life.

Still another object is to provide such a system which is readily adaptable for use in retrofitting existing vehicles as well as on new vehicles.

A further object is to provide such a system in which its vulnerability to light arms fire has been minimized.

Still another object is to provide such a system in which the individual wheel suspension units operate independently of each other so that in the event of damage to any one of the units, the operation of the other units will not be affected.

Another object is to provide such a system in which each of the individual wheel suspension units may be readily removed and replaced without affecting any of the other units.

These and other objects of the present invention may be achieved by providing a hydropneumatic suspension system comprised of plural separate individual wheel suspension units, one for each wheel, whereby should damage occur to any one of the units, it will not affect the operation of the other units. The heat generated by each individual wheel suspension unit is also kept to a minimum, and the heat that is generated is effectively dissipated through the vehicle hull by locating the valving and fluid passageways in close proximity to the hull. The valving and wheel crank arm shafts may be accommodated in a single casting with the valves positioned closely adjacent the individual unit mounting flanges for mounting the units to the hull of the vehicle.

Because of the jounce valve design, a large differential pressure is required to open the valve initially and at low flow rates, thus providing effective damping of the pitch, roll, and jounce of the vehicle. At higher flow rates the shape of the jounce valve may be controlled to utilize the flow forces or change of momentum of fluid to the jounce valve to assist in overpowering the valve spring for opening the valve with less differential pressure across the valve, thus reducing the stresses in the system and the heat generated while allowing the wheel to go over a bump with a minimum of disturbance to the chassis.

When the road arm returns to normal position, the hydraulic fluid passes through the rebound valve which is designed to minimize the generation of heat. An air cooled tube is also desirably provided in the fluid path between the actuator and accumulator to further dissipate heat. Increased heat dissipation may also be obtained by providing a flow path for the return fluid from the accumulator to the actuator in the unit mounting flange which is bolted or otherwise secured in close mating engagement with a large surface area of the vehicle hull.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is a fragmentary transverse section through the track of the vehicle of FIG 1 showing one of the individual wheel suspension units in elevation as seen from the plane of the line 3—3 of FIG. 1;

FIG. 4 is an isometric view of one of such individual wheel suspension units prior to attachment to the vehicle hull;

FIG. 6 is an enlarged fragmentary top plan view of the suspension unit, with portions broken away to show the internal valving;

FIGS. 7 and 8 are partial sections through the suspension unit of FIG. 6, taken on the plane of the line 7—7 and 8—8, respectively, to show the couplings between the cooling tube in the mounting flange and the fluid passageways in the main housing;

FIG. 9 is a partial side elevation view of the actuator and accumulator cylinders and showing in part section the connecting tube therebetween; and FIG. 10 is an enlarged fragmentary section showing the preferred configuration of the jounce valve and its seat for each individual wheel suspension unit.

DESCRIPTION OF THE PREFERRED EMBODIMENT

Figure 1:
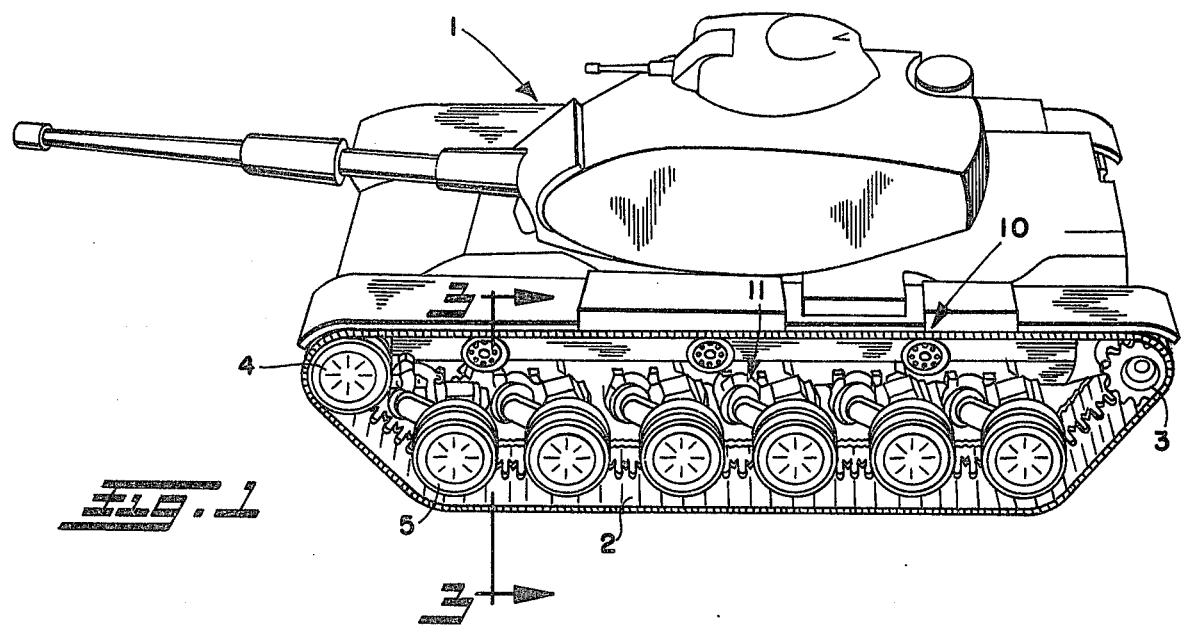
FIG. 1 is an isometric view of a tank incorporating a preferred form of hydropneumatic suspension system constructed in accordance with the present invention.

Referring now in detail to the drawings, and initially to FIG. 1 thereof, there is shown by way of illustration a tank 1 having an endless track 2 on each side thereof driven by a drive sprocket 3 at one end and having an idler 4 at the other end. The vehicle is supported as by a plurality of individually mounted road wheels 5 which ride on the track. Each road wheel is independently supported by separate individual wheel suspension units 11 which comprise the hydropneumatic suspension system 10 of the present invention, in a manner to be described more fully hereafter. While the vehicle on which the hydropneumatic suspension system is mounted is illustrated as being a tank, it will be apparent that such system may also readily be adapted for use on other heavy track vehicles, including armored vehicles used by the military, as well as on heavy tire supported vehicles.

As best seen in FIGS. 3 and 4, each wheel suspension unit 11 is provided with a mounting flange or plate 15 which may be bolted or otherwise suitably secured to the hull or frame 16 of the vehicle. The specific configuration of the mounting flange may be modified as desired to conform to the particular vehicle hull configuration on which it is to be mounted, and is just as easily adapted for use in retrofitting existing vehicles as on new vehicles. It is important, however, that such mounting flange have a relatively large surface contact area with the vehicle hull to provide an effective heat flow path from the unit to the vehicle hull for dissipation of heat generated in the damping valves during operation of the system, as described hereafter. The mounting flange 15 is shown integral with the main housing 17 of the unit, and such main housing is desirably formed from a single piece casting in which is suitably journalled the shafts 18 for the individual road arms 19 which carry the spindles 20 for each road wheel.

Figure 2:
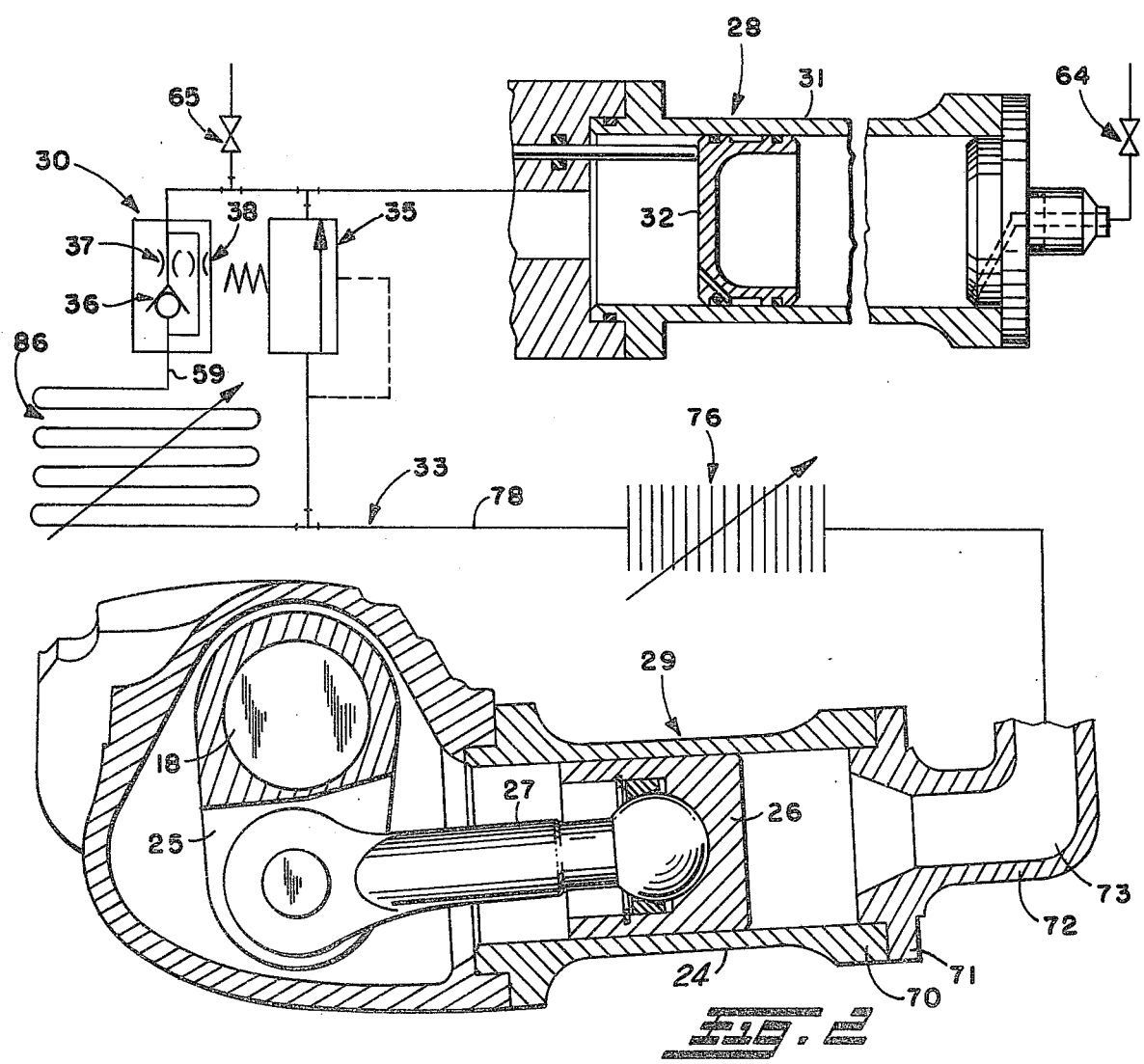
FIG. 2 is a schematic illustration showing one of the plural individual wheel suspension units which comprises the suspension system of the present invention.
Figure 5:
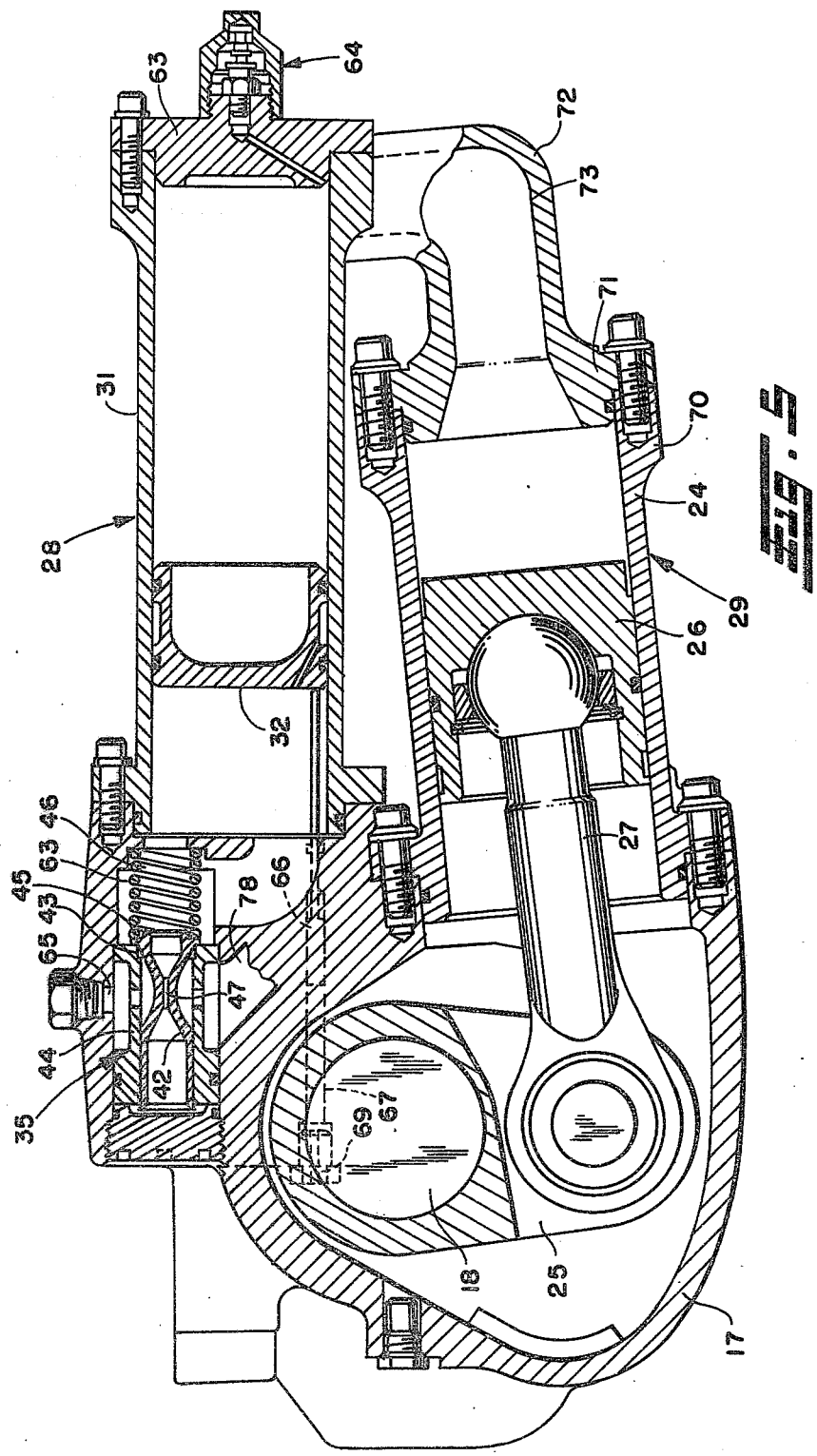
FIG. 5 is a longitudinal section through the suspension unit of FIG. 4, taken on the plane of the line 5—5 thereof.

The particular mechanism of each suspension unit which permits the individual road arms to move independently upwardly and downwardly over an obstacle without imparting a similar motion to the vehicle as a whole is schematically shown in FIG. 2. The road arm shaft 18 has a crank arm 25 thereon which is connected to an actuator piston 26 within the cylinder 24 of an actuator 29 by a connecting rod 27. Fluid communication is established between the actuator 29 and an accumulator 28 through suitable valving 30, described hereafter. Axially movable in the accumulator cylinder 31 is an accumulator piston 32, one side of which is exposed to a gas under pressure, and the other side is exposed to the hydraulic fluid which fills the hydraulic circuit 33 between the accumulator and actuator. The amount of hydraulic fluid in the system and the pressure of the gas within the accumulator is maintained at such a level that under normal operating conditions the actuator piston 26 is urged to the left as viewed in FIG. 2 which moves the road arm 19 downwardly for maintaining the vehicle in its normal upright position.

During movement of the vehicle, when the road wheel 5 engages a bump or other obstacle, the force on the road arm is greatly increased, which causes the actuator piston to move to the right, forcing a portion of the hydraulic fluid from the actuator 29 through the valving 30 to the accumulator 28. The additional hydraulic fluid entering the accumulator 28 urges the accumulator piston 32 to the right. This raises the pressure of the gas within the accumulator cylinder, which is effectively used to return the wheel to the normal ride position after the obstacle has been cleared in a manner to be subsequently described. The pressure within the accumulator cylinders always urges the wheels downwardly to conform to the contour of the terrain, whereby each wheel suspension unit 11 also acts as an active track tensioner at every wheel station to minimize loose track under dynamic conditions.

The valving 30 for controlling the flow of hydraulic fluid between the actuator 29 and accumulator 28 is also schematically shown in FIG. 2, and comprises a jounce valve 35 which opens when the road arm wheel 5 hits a bump, thus allowing the road arm 19 to move up very rapidly. Return of the road arm to its normal position occurs with the return flow of the hydraulic fluid through a rebound valve 36. The differential pressure through the rebound valve 36 and restriction 37 is much lower than through the jounce valve 35 thereby minimizing the generation of heat. Cooling may also be obtained by incorporating one or more auxiliary heat exchangers in the system, as described hereafter. A small capacity bypass 38 is provided between the actuator 29 and accumulator 28 to maintain the system in equilibrium and eliminate some of the high frequency vibrations that would otherwise occur during movement of the vehicle over small bumps and the like without requiring opening and closing of the jounce and rebound valves.

Each of the wheel suspension units 11 is completely independent of the others, and includes its own separate accumulator and valving, and such units are not interconnected in any way, which allows them to be readily adapted for use in retrofitting existing vehicles with torsion bar or tube over bar suspension systems as well as on new vehicles. The desired damping at the expected duty cycles is obtained without overheating any portion of the units by maximizing the dissipation of heat generated in the damping valves to the vehicle hull, which acts as a final heat sink. This is accomplished by locating the valve manifold 40 in close proximity to the mounting flange 15 (see FIGS. 4 and 6), and also providing for the transfer of heat from the valves to the main casting 17 which provides a solid large metallic cross sectional area for storage and conduction of heat to the vehicle hull through the mounting flange.

In the preferred form of the invention shown, the transfer of heat from the valves to the main casting 17 is maximized by locating the valves and porting therefor in the main casting itself closely adjacent the mounting flange. As clearly shown in FIGS. 6 and 10, the jounce valve 35 desirably consists of a differential pressure valve 42 which is substantially pressure balanced except for a small differential area formed by a step 43 in the valve sleeve 44 adjacent the valve seat 45, so that a relatively light spring 46 may be used to keep the valve closed under normal operating conditions even though acted upon by the relatively high fluid pressures in the actuator 29. A central passage 47 through the jounce valve 42 provides for balancing of the fluid pressure acting on opposite ends of the valve and prevents fluid from being trapped behind the valve.

When the fluid pressure in the actuator 29 exceeds a predetermined high level, which occurs, for example, when the road arm wheel hits a bump, the fluid pressure in the actuator acting on the differential area of the jounce valve 42 will cause the jounce valve to open and the road arm 19 to move up very rapidly. The outer wall 50 of the jounce valve 42 in the region of the valve seat 45 desirably tapers radially outwardly beyond the valve seat and terminates in a radial flange or shoulder 51 downstream of the valve seat, whereby the actuator fluid passing through the jounce valve is caused to bend around the jounce valve. Such changing of direction of the fluid flow around the jounce valve assists in opening the valve due to the change of momentum of the actuator fluid and results in a reduction of the differential pressure across the jounce valve when the jounce valve is open, which limits the transmission of disturbing forces to the vehicle hull, and also reduces the amount of heat generated by the actuator fluid passing through the jounce valve.

The rebound valve 36 comprises a valve poppet 55 axially slidably received in a valve sleeve 56 for movement toward and away from its seat 57. A spring 58 urges the valve poppet 55 toward its seat and is assisted in maintaining the valve poppet in its seated position by the pressure of the actuator fluid acting on the back side of the valve poppet when the actuator fluid pressure has increased due to the engagement of the road arm wheel with a bump or other obstacle. Fluid communication between the back side of the valve poppet and actuator may either be through an internal passageway 59 in the main casting 17 or through an alternate passageway 60, for a purpose to be subsequently described.

As the actuator fluid pressure drops off during traversal of a bump or other obstacle, the jounce valve 35 automatically closes and the increased fluid pressure in the accumulator 28 acting on the forward end of the rebound valve poppet 55 via passageway 61 in the main casting causes the rebound valve poppet to open for return flow of the fluid to the actuator, which causes the road arm to return to its normal position.

The small capacity orifice 38 for maintaining the system in equilibrium and eliminating some of the high frequency vibrations without having to open the respective jounce and rebound valves may be provided through the axial center of the rebound valve poppet 55, as shown.

The inboard end of the accumulator cylinder 31 which communicates with the actuator 29 through the valving is directly bolted or otherwise secured to the main casting 17 which provides the cover for that end. The fluid passageways 63, 61 in the casting leading to the valves 35, 36 communicate directly with the open inboard end of the accumulator. The accumulator cylinder extends outwardly from one side of the main casting generally perpendicular to the road arm shaft 18 and in direct exposure to the atmosphere to promote air cooling thereof and for ease of servicing. A cover member 63 is provided at the outermost end thereof, with a gas fill valve 64 therein for filling the gas side of the accumulator with the required air pressure. A suitable fill passage 65 in the main casting 17 also permits filling and replenishing of the unit with hydraulic fluid, as may be required. A feeler gauge 66 received in an opening 67 in the main casting whose axis is parallel to the axis of the accumulator cylinder and within the radial extent thereof may be pushed up against the end of the accumulator piston 32 by insertion of a rod extension 68 into the outer end of the opening when the vehicle is stationary. The rod extension 68 may be provided with suitable indicia thereon for ease of determining whether the hydraulic fluid or gas in the system needs replenishing. During operation of the vehicle, the rod extension may be removed and a screw plug 69 or the like inserted into the opening in its place.

The actuator cylinder 24 is also bolted or otherwise secured directly to the main casting 17 in line with the connecting rod 27 for direct connection between the connecting rod and actuator piston 26, and like the accumulator, extends outwardly from the main casting generally perpendicular to the axis of the road arm shaft in direct exposure to the atmosphere to provide for air cooling and for ease of accessibility for repair or replacement. For directing the hydraulic fluid between the outboard end 70 of the actuator 29 and the valve manifold 40, the closure plate 71 on the outboard end of the actuator desirably has a generally U-shape extension 72 thereon, with a correspondingly U-shape passage 73 therein. The end 74 of the extension 72 remote from the closure member faces in the direction of the main casting and has a recess 75 therein for receipt of one end of a tube or pipe 76 (see FIG. 9). The other end of the pipe 76 is received in a similar recess 77 in the main casting 17 in communication with the main flow passage 78 to the damping valves. An elongated bolt 79 extends through the tube 76 and aligned passages 80 and 81 in the actuator extension 72 and main housing 17, with a wrench head 82 on the outer end, and threads 83 on the inner end of the bolt for screwing into a tapped hole 84 in the main casting to provide a secure assembly.

The pipe or tube 76 is desirably of considerable length as shown and is directly exposed to the atmosphere to provide for additional dissipation of heat from the hydraulic fluid passing between the actuator and accumulator. Suitable cooling fins or the like may be provided along the length of the tube 76 if desired.

Additional heat may also be dissipated from the rebound flow of hydraulic fluid from the accumulator 28 to the actuator 29 by directing the rebound fluid flow through a flow tube 86 in the mounting flange 15 as shown in FIGS. 4 and 6 before returning such fluid to the actuator. A groove 87 may be provided in the inner face of the mounting flange for receipt of the tube. During assembly, the tube 86 is placed in the groove and the groove is then filled with solder and ground flush prior to mounting onto the hull of the vehicle. Recesses 88, 89 may be provided adjacent each end of the groove 87 (see FIGS. 6 through 8) for concealing the fittings 90 and 91 which connect the respective ends of the tube 86 to the downstream side of the rebound valve 36 and main flow passage 78 so that they are much less vulnerable to light arms fire and the like. Because the hydraulic fluid passes more slowly through the rebound valve 36, the transmission of heat from the fluid passing through the tube 86 to the mounting flange 15 and vehicle hull 16 contacted thereby will be enhanced.

Of course, if the additional rebound flow passage 86 through the mounting flange 15 is utilized, the interior passage 59 in the main casting 17 which communicates with the main flow passage 78 upstream of the jounce valve 35 must either be eliminated or blocked off as by inserting a plug 95 through an external opening 96 in the main casting for closing off the internal passage. Alternatively, if the additional flow passage 86 is not used, then the fluid connections 90, 91 to the downstream side of the rebound valve 36 and main flow passage 78 must either be blocked off as by inserting plugs in place of the fittings, or the additional flow passage 86 through the mounting flange 15 must be eliminated altogether.

Such a hydropneumatic suspension system provides for much greater wheel travel than the conventional torsion bar or tube over bar suspension systems, and has a higher level of energy absorption. In addition, such a system reduces the tendency of the vehicle to pitch, bounce, or roll, and there is also a relatively low level of resistance to the return of the wheels to the ride position which occurs in a minimum amount of time, with minimum loose track under dynamic conditions. The hydropneumatic suspension system of the present invention is also lighter and more compact than conventional torsion bar suspension systems for supporting a given load, and allows the vehicle to travel at a much greater speed over rough terrain.

The system disclosed herein is also of a relatively simple design and more durable than previous known suspension systems either of the torsion bar or tube over bar type or of the hydropneumatic type, and because each of the individual wheel suspension units is independent and isolated from each other, they may be quickly removed and replaced without requiring any jacking of the vehicle. The system can also be non-operational for extended periods of time, and become operational with minimum check out using the feeler gauge to determine the level of gas and hydraulic fluid in the system. The crank, road arm shaft, and shaft bearing arrangement also provide for a maximum capacity combined with ease of assembly, and the units are relatively well protected by the road wheels and road arms, and have excellent immunity to anti-tank mines. Also, because the air in the accumulator is stored outboard of the damping valves and main casting remote from the heat conduction path, the temperature of air will tend to remain constant thus maintaining a relatively consistent spring characteristic for the suspension unit. The compact design of each individual wheel suspension unit also results in only a small portion of the accumulator being exposed from the side, and none from the front. Such system also provides the first level of weapon stabilization, and makes it possible to fire from the vehicle while on the move at increased speeds because of the reduced hull disturbances.

The embodiments of the invention in which an exclusive property or privilege is claimed are defined as follows:

1. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means being located in close proximity to said mounting flange in heat transfer relation thereto to facilitate transfer of heat generated by the fluid passing through said valve means to said mounting flange and subsequent dissipation of such heat to the vehicle frame, said valve means being located in said housing closely adjacent said mounting flange, fluid passageways in said housing for flow of fluid between said actuator means and accumulator means through said valve means, said actuator and accumulator means including actuator and accumulator cylinders, respectively, each having inboard ends attached to said housing and outboard ends extending outwardly from said housing, an actuator piston axially movable in said actuator cylinder and connected to said support means through said inboard end of said actuator cylinder, and a fluid connection between the outboard end of said actuator cylinder and the inboard end of said accumulator cylinder through said valve means in said housing, said fluid connection comprising a pipe extending from the outboard end of said actuator cylinder to said housing in communication with a fluid passageway in said housing leading to said inboard end of said accumulator cylinder through said valve means, said pipe being exposed to the atmosphere for dissipation of heat thereto, said outboard end of said actuator cylinder having a closure member with a generally U-shape extension thereon, said extension having a corresponding U-shape passage therein, the inner end of said extension remote from said closure member facing in the direction of said housing and having a recess therein for receipt of one end of said pipe.

2. The wheel suspension unit of claim 1 wherein the other end of said pipe is received in a recess in said housing in communication with a fluid passageway therein leading to said valve means.

3. The wheel suspension unit of claim 2 further comprising bolt means extending through said pipe and extension and threadedly connected to said housing for securing said pipe between said housing and extension.

4. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means being located in close proximity to said mounting flange in heat transfer relation thereto to facilitate transfer of heat generated by the fluid passing through said valve means to said mounting flange and subsequent dissipation of such heat to the vehicle frame, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means in close heat transfer relation to said mounting flange, one of said fluid passageways being between said second valve means and said actuator means and extending around said mounting flange to provide for direct transfer of heat to said mounting flange from the fluid passing therearound.

5. The wheel suspension unit of claim 4 wherein there is a groove in the inner face of said mounting flange containing a tube which provides said one fluid passageway for flow of fluid around said mounting flange.

6. The wheel suspension unit of claim 5 wherein said groove with said tube therein is filled with solder and ground flush.

7. The wheel suspension unit of claim 5 wherein the ends of said groove terminate adjacent said housing, and there are recesses in said housing adjacent the ends of said groove for receipt of fittings for connecting the ends of said tube to fluid passageways in said housing.

8. The wheel suspension unit of claim 4 further comprising an alternate passageway in said housing between said second valve means and actuator means, and means for plugging said alternate passageway when said passageway in said mounting flange is in use.

9. The wheel suspension unit of claim 8 further comprising means for plugging said passageway in said mounting flange when said alternate passageway is in use.

10. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means being located in close proximity to said mounting flange in heat transfer relation thereto to facilitate transfer of heat generated by the fluid passing through said valve means to said mounting flange and subsequent dissipation of such heat to the vehicle frame, said valve means being located in said housing closely adjacent said mounting flange, fluid passageways in said housing for flow of fluid between said actuator means and accumulator means through said valve means, said actuator and accumulator means including actuator and accumulator cylinders, respectively, each having inboard ends attached to said housing and outboard ends extending outwardly from said housing, said housing being the cover for said inboard end of said accumulator cylinder, said accumulator cylinder containing a piston, means for introducing fluid into the inboard end of said accumulator cylinder, means for introducing gas into the outboard end of said accumulator cylinder, and gauge means for ascertaining the level of such fluid and gas in said accumulator cylinder by the location of said accumulator piston within said accumulator cylinder, said housing having an opening in communication with said inboard end of said accumulator cylinder for receipt of said gauge means which extends from said opening into said inboard end of said accumulator cylinder.

11. The wheel suspension unit of claim 10 further comprising a rod extension for insertion into the outer end of said opening for pushing said gauge means against said accumulator piston, said rod extension having indicia thereon for ascertaining the level of such fluid or gas by the position of said accumulator piston in said accumulator cylinder.

12. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means being located in close proximity to said mounting flange in heat transfer relation thereto to facilitate transfer of heat generated by the fluid passing through said valve means to said mounting flange and subsequent dissipation of such heat to the vehicle frame, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means in close heat transfer relation to said mounting flange, and a small capacity orifice in said second valve means for maintaining the pressure in said actuator means and accumulator means in equilibrium when said support means encounters high frequency vibrations without necessitating opening and closing of said first and second valve means.

13. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing, and there is a fluid connection between the outboard end of said actuator cylinder and the inboard end of said accumulator cylinder through said housing and valve means, said fluid connection comprising a pipe extending from the outboard end of said actuator cylinder to said housing in communication with a fluid passageway in said housing leading to said inboard end of said accumulator cylinder through said valve means, said pipe being exposed to the atmosphere for dissipation of heat thereto, said outboard end of said actuator cylinder having a closure member with a generally U-shape extension thereon, said extension having a corresponding U-shape passage therein, the inner end of said extension remote from said closure member facing in the direction of said housing and having a recess therein for receipt of one end of said pipe.

14. The wheel suspension unit of claim 13 wherein the other end of said pipe is received in a recess in said housing in communication with a fluid passageway therein leading to said valve means and bolt means extend through said pipe and extension and is threadedly connected to said housing for securing said pipe between said housing and extension.

15. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing, said housing comprising the cover for said inboard end of said accumulator cylinder, said accumulator cylinder containing a piston, means for introducing fluid into the inboard end of said accumulator cylinder, means for introducing gas into the outboard end of said accumulator cylinder, and gauge means for ascertaining the level of such fluid and gas in said accumulator cylinder by the location of said accumulator piston within said accumulator cylinder, said housing containing an opening for receipt of said gauge means, said opening being in communication with said inboard end of said accumulator cylinder, and said gauge means extending from said opening into said inboard end of said accumulator cylinder.

16. The wheel suspension unit of claim 15 further comprising a rod extension for insertion into the outer end of said opening for pushing said gauge means against said accumulator piston, said rod extension having indicia thereon for ascertaining the level of such fluid or gas by the position of said accumulator piston in said accumulator cylinder.

17. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing exposed to the atmosphere for dissipation of heat thereto, said valve means being located in said housing adjacent the inboard ends of said actuator and accumulator cylinders and closely adjacent said mounting flange in heat transfer relation thereto to facilitate transfer of heat generated by the fluid passing through said valve means to said mounting flange and subsequent dissipation of such heat to the vehicle frame, said housing having fluid passageways therein for flow of fluid between said actuator means and accumulator means through said valve means.

18. The wheel suspension unit of claim 17 wherein said mounting flange is integral with said housing.

19. The wheel suspension unit of claim 18 wherein said mounting flange and housing are comprised of a single piece casting.

20. The wheel suspension unit of claim 17 wherein there is an actuator piston axially movable in said actuator cylinder and connected to said support means through said inboard end of said actuator cylinder, and there is a fluid connection between the outboard end of said actuator cylinder and the inboard end of said accumulator cylinder through said valve means in said housing.

21. The wheel suspension unit of claim 20 wherein there is a shaft journalled in said housing, and a crank arm and connecting rod connecting said shaft to said piston, said support means comprising a road arm also connected to said shaft for rotation therewith whereby axial movement of said actuator piston causes pivotal movement of said road arm.

22. The wheel suspension unit of claim 20 wherein said fluid connection between the outboard end of said actuator cylinder and the inboard end of said accumulator cylinder comprises a pipe extending from the outboard end of said actuator cylinder to said housing in communication with a fluid passageway in said housing leading to said inboard end of said accumulator cylinder through said valve means, said pipe being exposed to the atmosphere for dissipation of heat thereto.

23. The wheel suspension unit of claim 17 wherein said valve means comprises a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said fluid passageways for directing the fluid between said actuator means and accumulator means being in close heat transfer relation to said mounting flange.

24. The wheel suspension unit of claim 17 wherein said housing is the cover for said inboard end of said accumulator cylinder, said accumulator cylinder containing a piston, and means for introducing fluid into the inboard end of said accumulator cylinder, and means for introducing gas into the outboard end of said accumulator cylinder.

25. The wheel suspension unit of clamp 24 further comprising gauge means for ascertaining the level of such fluid and gas in said accumulator cylinder by the location of said accumulator piston within said accumulator cylinder.

26. The wheel suspension unit of claim 23 wherein said first valve means includes means for permitting rapid flow of fluid from said actuator means to said accumulator means when the fluid pressure in said actuator means rapidly increases, and said second valve means includes means for permitting return flow of fluid from said accumulator means to said actuator means when the pressure in said actuator means is reduced.

27. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means being located in close proximity to said mounting flange in heat transfer relation thereto to facilitate transfer of heat generated by the fluid passing through said valve means to said mounting flange and subsequent dissipation of such heat to the vehicle frame, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means in close heat transfer relation to said mounting flange, said first valve means comprising a valve member and a valve seat, said valve seat having a step therein defining a small differential area on said valve member which is acted upon by the fluid pressure in said actuator means, and a relatively light spring for biasing said valve member against said valve seat under normal operating conditions even though acted upon by relatively high fluid pressures in said actuator means.

28. The wheel suspension unit of claim 27 wherein said valve member tapers radially outwardly beyond said valve seat and terminates in a radial flange extending outwardly of said valve seat.

29. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing exposed to the atmosphere for dissipation of heat thereto, and there is a fluid connection between the outboard end of said actuator cylinder and the inboard end of said accumulator cylinder through said housing and valve means, said fluid connection comprising a pipe extending from the outboard end of said actuator cylinder to said housing in communication with a fluid passageway in said housing leading to said inboard end of said accumulator cylinder through said valve means, said pipe being exposed to the atmosphere for dissipation of heat thereto.

30. A hydropneumatic suspension system comprising a plurality of isolated wheel suspension units for mounting the wheels of a vehicle to the vehicle frame, each said wheel suspension unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing exposed to the atmosphere for dissipation of heat thereto, said valve means being located in said housing adjacent the inboard ends of said actuator and accumulator cylinders and closely adjacent said mounting flange in heat transfer relation thereto to facilitate transfer of heat generated by the fluid passing through said valve means to said mounting flange and subsequent dissipation of such heat to the vehicle frame, said housing having fluid passageways therein for flow of fluid between said actuator means and accumulator means through said valve means.

31. A hydropneumatic suspension system comprising a plurality of isolated wheel suspension units for mounting the wheels of a vehicle to the vehicle frame, each said wheel suspension unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing exposed to the atmosphere for dissipation of heat thereto, and there is a fluid connection between the outboard end of said actuator cylinder and the inboard end of said accumulator cylinder through said housing and valve means, said fluid connection comprising a pipe extending from the outboard end of said actuator cylinder to said housing in communication with a fluid passageway in said housing leading to said inboard end of said accumulator cylinder through said valve means, said pipe being exposed to the atmosphere for dissipation of heat thereto.

32. A wheel suspension unit for mounting a wheel to a vehicle frame, said unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means, one of said fluid passageways extending around said mounting flange between said second valve means and said actuator means to provide for direct transfer of heat to said mounting flange from the fluid passing therearound.

33. The wheel suspension unit of claim 32 wherein there is a groove in the inner face of said mounting flange containing a tube which provides said one fluid passageway for flow of fluid around said mounting flange.

34. The wheel suspension unit of claim 33 further comprising an alternate passageway in said housing between said second valve means and actuator means, and means for plugging said alternate passageway when said one passageway in said mounting flange is in use.

35. A wheel suspension unit for mounting a wheel to a vehicle frame comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing, a fluid connection extending from the outboard end of said actuator cylinder to said housing in communication with a fluid passageway in said housing leading to said inboard end of said accumulator cylinder through said valve means, said fluid connection being exposed to the atmosphere for dissipation of heat thereto, said valve means being located adjacent the inboard ends of said actuator and accumulator cylinders in close proximity to said mounting flange in heat transfer relation thereto to facilitate transfer of heat generated by the fluid passing through said valve means to said mounting flange and subsequent dissipation of such heat to the vehicle frame, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means, one of said fluid passageways including a fluid path extending around said mounting flange between said second valve means and said actuator means adjacent the inner face of said mounting flange to provide for direct transfer of heat to said mounting flange from the fluid passing therearound.

36. A hydropneumatic suspension system comprising a plurality of isolated wheel suspension units for mounting the wheels of a vehicle to the vehicle frame, each said wheel suspension unit comprising a housing, a mounting flange on said housing for attachment to a vehicle frame, movable support means for such wheel carried by said housing, fluid actuator means operatively connected to said support means for urging said support means in a direction for supporting the vehicle frame off the ground, accumulator means in fluid communication with said actuator means for supplying fluid under pressure to said actuator means, and valve means for controlling the flow of fluid between said actuator means and accumulator means in response to pressure variations therein, said actuator and accumulator means including actuator and accumulator cylinders, respectively, each having inboard ends attached to said housing and outboard ends extending outwardly from said housing, a fluid connection extending from the outboard end of said actuator cylinder to said housing in communication with a fluid passageway in said housing leading to said inboard end of said accumulator cylinder through said valve means, said fluid connection being exposed to the atmosphere for dissipation of heat thereto, said valve means being located adjacent the inboard ends of said actuator and accumulator cylinders in close proximity to said mounting flange in heat transfer relation thereto to facilitate transfer of heat generated by the fluid passing through said valve means to said mounting flange and subsequent dissipation of such heat to the vehicle frame, said valve means comprising a first valve means for permitting flow of fluid from said actuator means to said accumulator means in response to a rapid increase in fluid pressure in said actuator means, and a second valve means for permitting return flow of fluid from said accumulator means to said actuator means when the fluid pressure in said actuator means decreases, said first and second valve means including fluid passageways for directing the fluid between said actuator means and accumulator means, one of said fluid passageways including a fluid path extending around said mounting flange between said second valve means and said actuator means adjacent the inner face of said mounting flange to provide for direct transfer of heat to said mounting flange from the fluid passing therearound, each said isolated wheel suspension unit being independent of the others and including its own fluid supply.

* * * * *